March 24, 1953
J. A. OPPEL
2,632,823
OVERRIDING INVERSE TIME-DELAY TRIP
MECHANISM FOR CIRCUIT BREAKERS
Filed Dec. 29, 1948
3 Sheets-Sheet 1
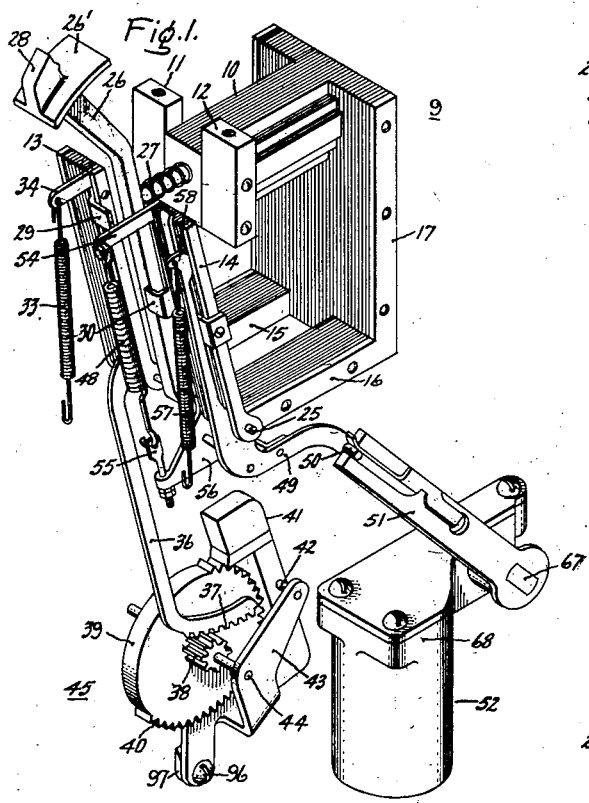
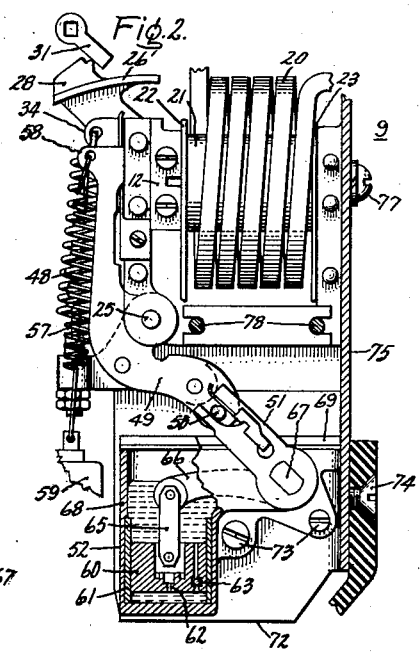
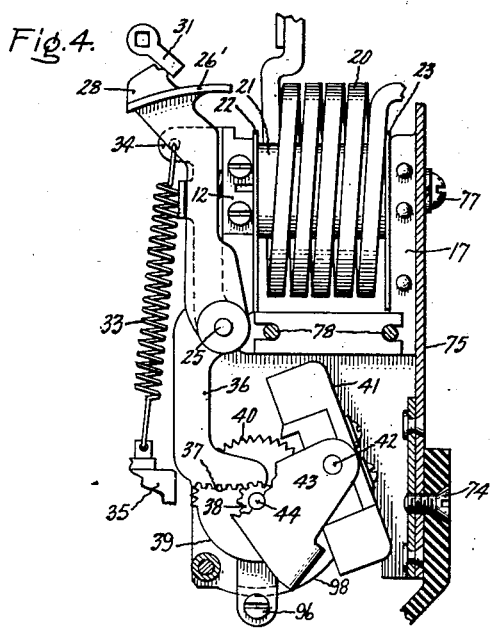
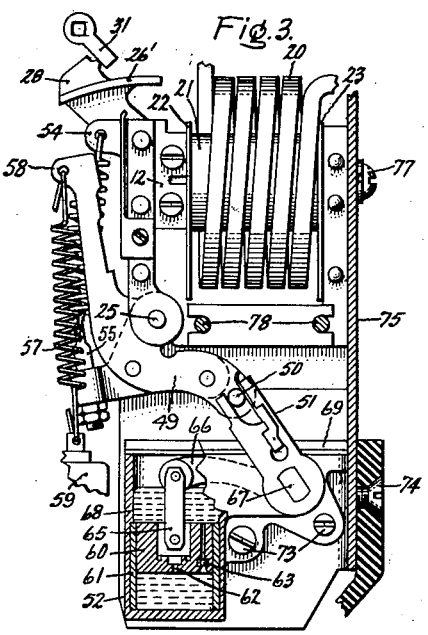
Inventor:
John A. Oppel,
by Ernest C. Britton
His Attorney.

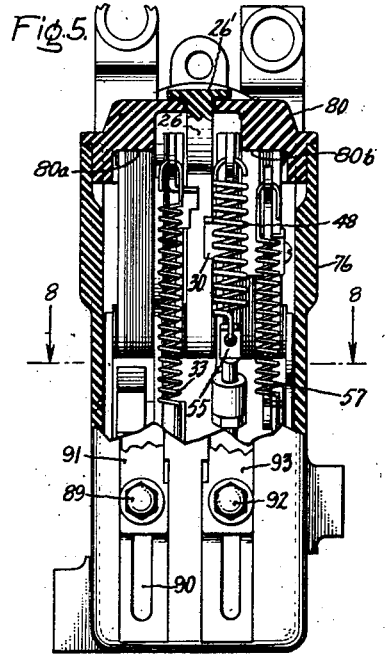
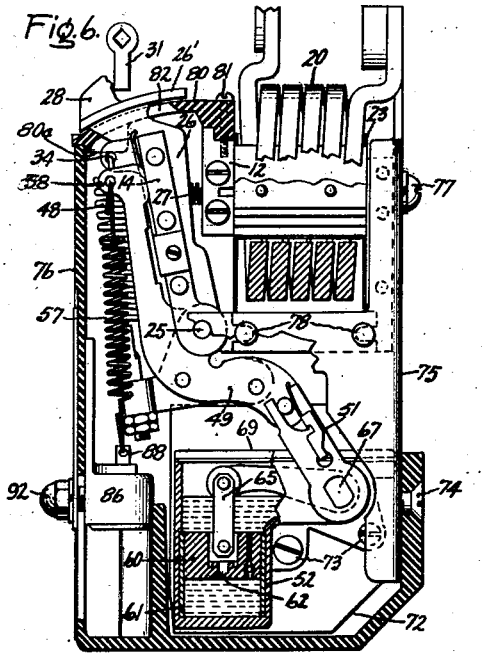
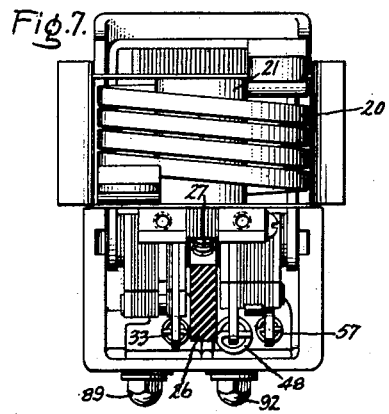
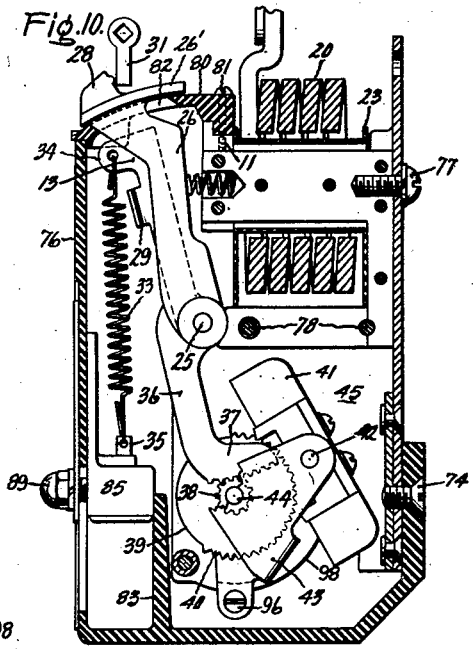
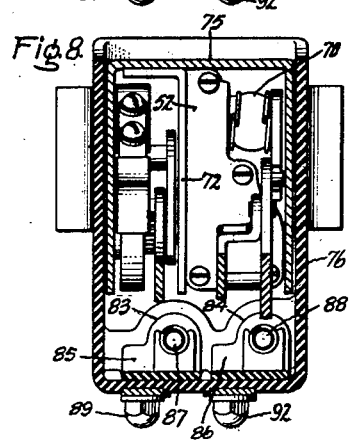
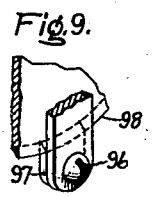

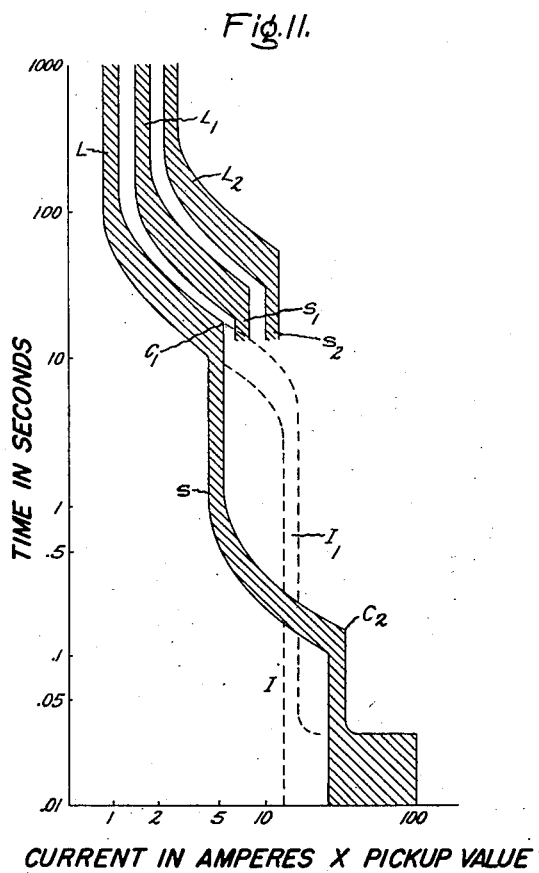

Patented Mar. 24, 1953

2,632,823

UNITED STATES PATENT OFFICE 2,632,823

OVERRIDING INVERSE TIME-DELAY TRIP MECHANISM FOR CIRCUIT BREAKERS

John A. Oppel, Aldan, Pa., assignor to General Electric Company, a corporation of New York Application December 29, 1948, Serial No. 67,816

13 Claims. (Cl. 200—108)

1

The invention relates to inverse time-delay trip mechanisms for circuit breakers and provides an improved double magnetically symmetrical armature inverse time delay selectively overriding form of electromagnetic direct trip mechanism particularly suitable for use in a series circuit breaker power distribution protective system for introducing non-linear variable double inverse overriding time-delays to enforce selective tripping of the series of breakers in predetermined closely adjacent overcurrent ranges and to insure instantaneous tripping only in a predetermined maximum fault current range although the improved double inverse time delay selectively overriding separately adjustable sequential armature mechanism may be used with advantage in other systems if desired.

In many electric power distribution systems, as for example on shipboard or in a steel mill, chemical plant, or the like, even short duration unnecessary power outages on criitcal load circuits can result in heavy losses or damage to expensive equipment so that every effort has heretofore been made to guard against avoidable power interruptions.

Thus in applying a series of overcurrent responsive circuit breakers to protect such electric power distribution systems, it has long been desirable that the non-linear variable inverse trip timing of the main supply line breaker, the bus tie breakers, the feeder breakers and the individual load circuit breakers be sequentially coordinated in predetermined adjacent overcurrent ranges so that only the breaker nearest a fault is opened in order to limit the disturbance or power outage to the smallest possible portion of the distribution system. But this requires accurate selective double non-linear variable inverse time delay overcurrent trip mechanisms for the preceding breakers in order to cause the feeder breaker to wait long enough for operation of the load breaker and the main supply breaker or bus tie breaker to wait long enough for operation of the feeder breaker and thereby provide the maximum of service continuity. Furthermore, such sequential selective double non-linear variable inverse timing of response must be obtainable at all overcurrent values to be encountered in the system.

However, none of the circuit breaker inverse time-tripping mechanisms heretofore commercially available were either double non-linear variable or selectively overriding and such available devices generally become inherently instantaneous for fault currents in a range above

2 ten to twelve times the continuous current rating of each breaker. As a result, for many important ratings of breakers, the instantaneous characteristics of the available inverse time-tripping mechanism inherently become effective at values much below the maximum interrupting rating of the breaker so that full advantage could not be taken of the inverse time delay characteristics to provide selectivity in all overcurrent ranges.

The principal object of the present invention is to provide an improved double magnetically symmetrical armature non-linear variable inverse time delay selectively overriding form of circuit breaker direct acting electromagnetic tripping device capable of producing low overcurrent relatively long inverse non-linear variable time-delay, overriding itnermediate overcurrent relatively short inverse non-linear variable time-delay, overriding intermediate overcurrent instantaneous tripping in any desired combinations required to produce selective tripping within predetermined contiguous overcurrent ranges and thereby enable complete selectivity to be obtained at all overcurrent values encountered in distribution systems such as indicated above.

Another object is to provide an improved selective overriding electromagnetic direct trip mechanism capable of producing all three selective degrees of operation, i. e., long time, short time, and instantaneous, or a combination of any two without a break in contiguity, or any one degree by itself so as to adapt the improved selective overriding tripping mechanism for universal application to load circuit breakers, feeder breakers and bus tie or main supply breakers as desired.

Another object is to combine the low range overcurrent non-linear variable long inverse time mechanism with an overriding intermediate range overcurrent non-linear variable short inverse time mechanism and, if desired, an overriding maximum range overcurrent instantaneous tripping mechanism so as to produce an abruption automatically between the contiguous operating ranges and thereby enable a properly calibrated series of the improved selective overriding circuit breaker direct tripping devices to be coordinated for selective tripping with a minimum current spread therebetween. Only in this way can the sharp corners that will enable close nesting of the non-linear variable long and short inverse time current-operating characteristic curves of the selective tripping devices be obtained.

Another object is to provide for independent adjustment of the particular current ranges within which the long inverse time, the overriding short inverse time, and the overriding instantaneous circuit breaker tripping mechanism become effective without interference therebetween.

Another object is to provide an improved selective overriding form of double armature overcurrent responsive electromagnet with separate time-delay tripping mechanism for enabling one armature to produce non-linear variable inverse short time-delay direct tripping in a variable intermediate overcurrent range and the other armature to produce both non-linear variable inverse long time-delay direct tripping in a definite relatively low overcurrent range contiguous to the intermediate range and instantaneous direct tripping only when the overcurrent reaches a predetermined maximum range contiguous to the intermediate range.

Another object is to provide an improved compactly nested form of double inverse non-linear variable time-delay electromagnetic trip mechanism having a trip member pivotally mounted between coaxially pivoted selectively overriding armatures of a single winding overcurrent responsive double-pole electromagnet and having separate short and long time-delay mechanisms nested under and operatively connected with a corresponding pivoted armature and provided with improved calibrating means for separately adjusting the long time and short time tripping ranges thereof.

Further objects and advantages of the invention will appear in the following description of the accompanying drawings in which Fig. 1 is a perspective view showing schematically the principal parts of the improved selective overriding double armature electromagnetically operated short inverse time, long inverse time, and instantaneous direct trip mechanism; Fig. 2 is a side view of the trip mechanism shown in Fig. 1, with the long inverse time-delay device partly in section in order more clearly to show the details of construction; Fig. 3 is a similar sectional side view of the mechanism showing the long inverse time delay operating armature in the attracted or tripping position to which it is operated instantaneously independently of the long time-delay mechanism; Fig. 4 is a similar view in section to show the details of construction of the short inverse time-delay mechanism and the operating armature therefore; Figs. 5 and 6 are respectively a front view and a side view, partly in section showing the improved double armature electromagnetic short inverse time, long inverse time and instantaneous trip mechanism nested within its molded insulating enclosing casing and provided with external adjustment members for the short time and long time pickup range calibrating springs; Fig. 7 is a top view of the mechanism shown in Figs. 5 and 6; Fig. 8 is a partial sectional view showing more clearly the juxtaposed nested arrangement of the short and long inverse time mechanisms within the enclosing casing; Fig. 9 is a partial view showing the time adjustment for the short inverse time mechanism; Fig. 10 is a side view partly in section showing more clearly the short inverse time mechanism and its operating armature; and Fig. 11 shows the typical double non-linear overriding time-current operating characteristic curves of the improved selective overriding long and short time delay tripping device.

The improved overcurrent responsive selective double magnetically symmetrical armature overriding direct tripping mechanism, as schematically shown in Fig. 1, comprises the tripping electromagnet indicated generally by the reference character 9 and provided with a magnetic structure including a core 10 having a pair of pole pieces 11, 12 in spaced-apart alignment and in attractive relation respectively with the short time-delay operating armature 13 and the spaced apart selective long time-delay and instantaneous operating armature 14 so as to provide for parallel symmetrical attraction thereof. The parallel magnetic circuits for the coaxially pivoted selectively overriding armatures 13 and 14 are completed through the two parallel spaced apart bottom yokes 15, 16 that provide a pair of like poles in spaced-apart alignment and the common return yoke 17 that, as indicated in the drawing, are laminated in order to adapt the tripping electromagnet 9 for alternating current as well as direct current service. As shown in Fig. 2, a heavy duty magnetizing winding 20 adapted to be energized by the current through the circuit breaker is mounted on the magnetic core 10 with a suitable insulating bushing 21 interposed between the winding and the core and also with insulating end plates 22 and 23 interposed between the end turns of the winding and the adjacent parts of the electromagnet.

The pair of selectively overriding operating armatures 13 and 14 are coaxially pivotally mounted upon a bearing pin 25 on opposite sides of the circuit breaker trip operating member 26. The trip operating member 26 also is pivotally mounted on the pin 25 coaxially between the armatures 13 and 14 with the compression spring 27 interposed between the electromagnetic core 10 and the trip operating member 26 so as to bias the trip operating member 26 to its nontripping position in which it is shown in Fig. 10. The armature 13 is provided with an overriding operating arm 29 for engaging with the trip operating member 26 to operate this member to the tripping position when the armature 13 is attracted towards the pole pieces 11. Likewise, armature 14 is provided with an overriding operating arm 30 that engages with the trip operating member 26 to operate this member to the tripping position when the armature 14 is attracted towards the pole piece 12. Thus, either armature 13 or 14 can override the other to separately operate the trip operating member 26 so as to engage the finger 28 with the usual circuit breaker latch releasing arm 31 as shown in Fig. 2. Since the circuit breaker may be of any usual or well known form, common to the art, the details thereof are not shown.

The pickup current value for attracting the short time-delay operating armature 13 is controlled by an adjustable calibrating spring 33 having one end in hooked engagement with an arm 34 extending from armature 13 and the other end in hooked engagement with an adjustable pickup calibrating member 35 as shown in Fig. 10. The armature 13 carries integral therewith an overhanging arm 36 provided with a rack gear 37 engaging the pinion 38 to rotate the ratchet wheel 39 that is provided with teeth 40 over a substantial portion of the periphery thereof for operative engagement with the cooperating oscillating escapement timing pallet 41. The escapement pallet 41 is centrally pivoted on the pin 42 carried by the bracket arm 43 that is rotatable about the same axis 44 as the ratchet wheel 39 to regulate the timing operation of the short time-delay escapement mechanism indicated generally by the reference character 45.

The selective long time-delay and instantaneous operating pivoted armature 14, as indicated in Fig. 1, is resiliently connected by means of a relatively strong adjustable instantaneous pickup calibrating spring 48 with the coaxially pivoted lever 49 that in turn is connected by means of the pin 50 and the slotted arm 51 to operate the long time-delay dashpot device 52. The relatively strong instantaneous pickup calibrating spring 48 has one end thereof in hooked engagement with the arm 54 carried integrally by the armature 14 and the other end of the calibrating spring 48 is adjustably connected by means of the threaded link 55 with the arm portion 56 of the bell crank lever 49 that is pivotally mounted on the bearing pin 25 so as to permit independent pickup of the armature 14 when the instantaneous pickup calibrating spring 48 is stretched as indicated in Fig. 3. The bell crank operating lever 49 of the long time-delay mechanism is provided with a separate relatively weak pickup calibrating spring 57 having one end in hooked engagement with the upper end 58 of the bell crank lever 49 and the other end in hooked engagement with the pickup adjustment member 59 so as to calibrate the minimum current through winding 20 required to attract armature 14 sufficiently to initiate the long time-delay tripping action.

As shown more clearly in the sectional views of Figs. 2 and 3, the long time-delay device 52 is of the dashpot type having a piston 60 reciprocating within a cylinder 61 that is filled with liquid preferably a substantially constant viscosity oil such as silicone oil. Thus the rate of movement of piston 60 in the downward direction is governed by the flow of oil through the specially formed restricted orifice 62 in the piston 60 that may be varied to correspondingly vary the timing action. The upstroke of the piston is relatively unretarded due to the provision of the check valve 63. The piston 60 is connected by the pivoted link 65 with the arm 66 having a shaft 67 that extends through a suitable bearing formed in the side of the enclosing casing 68 with the slotted lever 51 mounted on the flattened end of shaft 67. The enclosing casing 68 is sealed by a removable cover 69 and the shaft 67 likewise is sealed, preferably by a flexible torsion sealing member 70, having one end clamped to rotate with the shaft 67 and the other end clamped to the bearing therefor as indicated in Fig. 8.

The long time-delay device 52 is removably mounted upon a central partition plate 72 by means of the mounting screws 73 so as to nest the long-time mechanism 52 compactly in the space directly below and adjacent the magnetic yoke 16 and the armature 14 of the operating electromagnet 10. The partition plate 72 is fixed inside the electromagnet mounting channel frame member 75 which telescopes into an open box-like enclosing casing 76 formed of molded insulating material as more clearly shown in Figs. 6, 7 and 8. The enclosing casing is secured to the frame 75 by the holding screws 74. The operating electromagnet 9 is mounted inside the channel frame 75 by means of the mounting screw 77 and the two mounting rivets 78 that extend through the yokes 15 and 16 between the sides of the channel. Also, the bearing pin 25 that coaxially pivots the armatures 13 and 14, the trip operating member 26 and the lever 46 has its ends fixed in the sides of the channel mounting frame 75 that straddles the yokes 15 and 16 to bring the pair of spaced-apart aligned poles formed thereby in more intimate magnetic conductive relation with the pivoted ends of the armatures as indicated in Fig. 6.

Thus, when the channel mounting frame 75 is telescoped into the open boxlike insulating enclosing casing 76 and secured therein as indicated in Figs. 5 and 6, the frame 75, together with the parts of the operating electromagnet 9 and the partial cover plate 80 serve to substantially close and seal the entire trip timing mechanism in nested relation within the enclosing casing 76. The partial cover 80 is mounted upon the pole pieces 11 and 12 by means of the mounting screws 81 so as to substantially close the open top of the enclosing casing 76 with the skirted end 26' of the trip member 26 overlying the slot 82 formed in the cover 80 through which the trip arm 26 extends to carry the trip finger 28 thereof into operating relation with the circuit breaker releasing lever 31. The slot 82 formed in the cover 80 serves to limit the movement of trip operating member 26 under the bias of spring 27 and suitable projections 80a and 80b molded in the cover 80 serve as stops to accurately limit the movement of the armatures 13 and 14 respectively away from the pole pieces 11 and 12 into their magnetically symmetrical pickup positions with the overriding operating arms 29 and 30 spaced slightly away from the trip operating member 26 as indicated in Fig. 10.

The enclosing casing 76 is molded to provide a pair of guide chambers 83 and 84 within which the corresponding pickup calibrating adjustment members 85 and 86 slide to control the energizing current of winding 20 required to attract armatures 13 and 14 out of engagement with the stops 80a and 80b respectively. The calibrating adjustment member 85 is provided with a pin 35 for hooked engagement with the pickup calibrating spring 33 of the short time-delay mechanism operating armature 13. Likewise the adjustment member 86 is provided with a pin 88 for hooked engagement with the end of the separate relatively weak pickup calibrating spring 57 controlling the operation of the long time-delay device 52. The pickup adjustment member 85 is provided with a clamping nut 89 that engages with a suitable stud extending from the adjustment member 85 through a slot 90 molded in the enclosing casing 76 so that a pickup current calibrating scale 91 that slides in a suitable slot molded on the outside of the enclosing casing 76 also is clamped in its corresponding pickup calibrating position by the clamping nut 89.

The calibrating member 86 also is provided with a clamping nut 92 and pickup current calibrating scale 93 constructed and arranged in the same way as just described.

*Long time operation*

When the energizing winding 20 of the operating electromagnet 9 is energized by overcurrent, the armature 14 will be attracted at a relatively low pickup value of the current determined by the position of the adjustment member 86 and the resulting restraining force of the calibrating spring 57. In this case the attractive force exerted on armature 14 is transmitted through the relatively strong instantaneous calibrating spring 48 which strongly holds the upper end 58 of the bell crank member 49 in overlapping engagement with armature 14 and thence to the relatively weak calibrating spring 57. During the long time delay tripping operation, spring 48 acts as a force transmitting member and does not resist attractive force on the armature. Consequently, when the long time-delay calibrated pickup current value is reached, the movement of the armature 14 is retarded by the action of the long time-delay mechanism 52 due to the fact that the piston 60 must displace the oil from the bottom of the cylinder 69 through the restricted orifice 62. Thus, when the magnetizing winding 20 is energized by a moderate overcurrent within a range having a lower limit corresponding to the pickup current value of the armature 14 as determined by the adjustment of spring 57, which for motor branch circuit breakers may be approximately 125 per cent, and preferably not less than 115 per cent or more than 140 per cent of motor full-load current, a substantial long time-delay, for example between 20 to 30 seconds and decreasing inversely as a non-linear function of the increase in overcurrent above the pickup value, may be provided by the long time dashpot device 52 before the armature can move sufficiently to engage the arm 30 with the trip operating member 26 and carry the finger 28 into tripping engagement with the circuit breaker latch releasing arm 31 as shown in Fig. 2. Such inverse non-linear variable time-delay is determined by the overcurrent value as well as by the size of the orifice 62 in the piston 60, which may be varied as desired. In this way, the long inverse time-delay device 52 may be calibrated to prevent a motor branch circuit breaker from opening under moderate motor overload conditions until the overload has persisted long enough that damage to the motor or other equipment is likely to result.

*Instantaneous operation*

In case the magnetizing winding 20 of the operating electromagnet 9 is energized with an excessive overcurrent such as might result from a shorting or a grounding of the motor branch circuit conductors, then the magnetic attractive force exerted upon the armature 14 becomes sufficient to effect instantaneous pickup of the armature by stretching the relatively strong instantaneous pickup calibrating spring 48 thereby producing overriding movement of the armature 14 independently of the retarding effect of the long inverse time-delay device 52. The excessive current value at which such independent instantaneous overriding movement of armature 14 occurs is determined by the adjustment of the tension of spring 48 by means of the threaded adjustment link 55. In this way, for example, the instantaneous overriding pickup value of armature 14 may be adjusted to occur at a current value of the order of approximately 15 times the motor full-load current. Thus whenever such an excessive overcurrent value occurs, armature 14 operates substantially instantaneously to engage the trip operating member 26 and move the trip finger 28 into releasing engagement with the circuit breaker latch releasing member 31 independently of the dashpot 52.

*Short time operation*

In an overcurrent range that is intermediate the moderate current long inverse time operating range and the overriding maximum overcurrent instantaneous operating range, both armatures will be attracted but the armature 13 will move at a faster rate under the control of the short time operating mechanism 45 to override the armature 14 and independently operate the trip operating member 26 to its tripping position. Thus, both the upper limit of the long time operating range and the lower limit of the short time range is determined by the adjustment of the pickup calibrating spring 33 for the overriding armature 13 and may be approximately equal to 500 per cent of the long time-delay pickup value when the tripping mechanism is used with a feeder breaker or the like which is one breaker removed from the load breaker. Under these conditions the short time-delay unit provides an inverse time current tripping characteristic and the time-delay for a given current value is determined by the number of oscillations of the pallet 41 before free runoff of the escapement wheel 39 is attained. In order to vary the number of teeth on wheel 39 to be engaged by the pallet 41, the pivot axis 42 of the pallet 41 may be shifted by loosening the clamping screw 96 holding the clamp 97 in engagement with the curved chamfered edge 98 of one side of the U-shaped channel 75 as more clearly shown in Figs. 9 and 10 so as to permit the bracket frame 43 to be rotated about the axis 44 and thereby cause the pallet 41 to engage a smaller or greater number of teeth on the ratchet wheel 39 before free runoff therefrom.

The overall operating characteristics provided by the selective overriding double magnetically symmetrical armature inverse time-delay tripping mechanism are illustrated by the typical non-linear inverse time-current characteristic curves of Fig. 11. The long time-delay curve L shows that when the overcurrent exceeds a relatively low value the rate of the resulting attractive movement of armature 14 is regulated by the long time-delay mechanism 52 to delay the operation of the trip operating member 26 for a predetermined relatively long interval that decreases as an inverse non-linear function of the increase in overcurrent above the low value. The short time-delay curve S shows that when the overcurrent exceeds a higher predetermined value the rate of the resulting attractive movement of the armature 13 is regulated by the short time delay escapement mechanism 45 to delay the overriding operation of the trip operating member 26 for an interval materially less than the decreased interval provided by the long time delay mechanism 52 at the higher overcurrent value and decreasing as an inverse non-linear function of the increase in the overcurrent above the higher value. The instantaneous portion I represents the substantially instantaneous attraction of armature 14 under the control of the instantaneous calibrating spring 48 at a maximum overcurrent value.

The range of the operating characteristic curves L and S can be varied readily to meet varying tripping requirements. The lower limit of the relatively low overcurrent long time-delay operating range L is variable by the separate adjustment of the calibrating spring 57, the upper limit of the relatively low overcurrent long time operating range L as well as the lower limit of the contiguous intermediate short time delay range S is variable by the separately adjustable calibrating spring 33 and the upper limit of the short time intermediate range as well as instantaneous operating current value is variable by the separately adjustable calibrating spring 48. Consequently, the overall composite operating characteristics of the improved selective overriding time-delay tripping device can be widely varied as desired to cover the entire range of currents to be encountered in any circuit breaker protective system.

The inverse time current operating characteristic curves L and S are shown as curving bands that increase in width from the lower overcurrent limit of each range to the higher overcurrent limit of each range in order more accurately to represent the inherent variations in both time and current at which the tripping action may occur. Thus, the band width takes into account not only the minor variations between supposedly duplicate breakers, but also between successive operations of the same breaker that may result from the breaker actually having a slightly different current response action as well as a slightly different time delay action due to unavoidable vagrancy in the operating conditions, manufacture, assembly, or calibration. Such operating bands necessarily widen out since, in the lower overcurrent part of the operating range, the current response variation is the principal controlling factor while in the upper overcurrent part of the range the possible variation is increased due to the superimposed variations in the timing action.

It is important to note that in the overriding transition from the long time delay operating range indicated by the curve L to the short time operating range indicated by the curve S, a sharp corner C-1 inherently is produced in the composite characteristic curve due to the selective overriding action of the short time operating armature 13 under the control of the short time delay escapement mechanism 45. Thus, in case the current through the circuit breaker increases suddenly from some normal value to the calibrated overcurrent value required to initiate response of the short time operating armature 13, the long time armature 14 will also necessarily respond to its lower calibrated value of pickup current and start to effect operation of the tripping member 26 to the tripping position under the time delay retarding action of the long time delay mechanism 52. However, under such circumstances, the short time delay operating armature 13 will inherently override the long time delay operating armature 14 and thereby effect the actual movement of the trip operating member 26 to the tripping position in the materially shorter time interval provided by the short time-delay escapement mechanism 45 before the long time-delayed armature 14 can reach the tripping position. As shown by the characteristic operating curves of Fig. 11, such overriding action will occur whenever the overcurrent reaches the value indicated at the point C-1 thereby producing a sharp corner since the time-delay retarding action of the escapement mechanism 45 is materially less than that of the dashpot mechanism 52 whenever both armatures are simultaneously attracted at the same overcurrent value.

A somewhat similar overriding action occurs at the point C2 when the armature 14 responds to the maximum instantaneous trip operating value of current to independently operate the tripping member 26 to the tripping position and thus override the short time-delay armature 13.

In case the instantaneous tripping action is not desired, the instantaneous calibrating spring 48 may be replaced by a non-yielding link so that upon tightening the adjusting screw 55, the operating lever 49 of the long time-delay mechanism 52 will always move jointly with the armature 14. As a result, there will be no overriding instantaneous tripping action as indicated by the curve I and the short time tripping operation will simply continue into the higher current values as indicated by the dotted extension of the curve S.

In case the short time operating characteristic is not desired, the armature 13 together with the short time escapement mechanism 45 may be entirely removed from the device and only the armature 14 and long time-delay mechanism 52 employed. In this case the long time-delay operating characteristic curve will continue until overridden by the instantaneous tripping action as indicated by the dash line instantaneous tripping curve I. As shown, the value of maximum overcurrent at which such overriding action takes place is lowered by decreasing the force of the instantaneous calibrating spring 48 so that the instantaneous tripping will override the long time delay tripping at the desired lower current value.

Due to the sharp corner C1 inherently obtained in the operating characteristic curve of the improved selective overriding tripping mechanism of the present invention, the tripping operations of a series of breakers in a selective protective system can be so calibrated and coordinated that their characteristic curves will lie very closely adjacent each other as indicated by the additional similar operating characteristic curves L-1 and S-1 and L-2 and S-2 in Fig. 11 with very little current spread between the long time operating similar characteristic bands L, L-1, and L-2 as well as very little current spread between the short time operating similar bands S, S-1, and S-2, thereby enabling complete selectivity to be obtained within closely adjacent overcurrent ranges.

What I claim as new and desire to secure by Letters Patent of the United States is:

1. A double inverse time-delay circuit breaker tripping device having in combination, a movable trip operating member, a variable overcurrent responsive electromagnet having a pair of magnetically symmetrical armatures provided with overriding connections for operative engagement with the trip operating member to operate the member to the tripping position upon equal attractive movement of either armature, a long time-delay mechanism having adjustable means for variably biasing the mechanism to an initial position and having connections with one of said armatures to prevent attraction thereof until the overcurrent energization of the electromagnet exceeds a predetermined value dependent upon the adjustment of said biasing means and to retard the attractive movement of the one armature and the resulting operation of the trip operating member to the tripping position for a relatively long interval variable as an inverse nonlinear function of the excess of the overcurrent above said value, and a short time-delay mechanism having separately adjustable means for variably biasing the mechanism to an initial position and having connections with the other armature to prevent attraction thereof until the overcurrent energization of the electromagnet exceeds a higher predetermined value dependent upon the adjustment of said separately adjustable biasing means and to retard the equal attractive movement of the other armature and the resulting overriding operation of the trip operating member to the tripping position for an interval materially less than the decreased interval provided by the long time-delay mechanism at the higher predetermined value and variable as an inverse non-linear function of the excess of the overcurrent above said higher value.

2. A double inverse time-delay circuit breaker tripping device having in combination a movable trip operating member provided with alternative overriding operating armatures having substantially equal movements from the unattracted to the attracted positions thereof, means including an overcurrent responsive electromagnet and a pair of separately adjustable armature pick up calibrating springs, each connected to control a corresponding armature for starting the attractive movements of said armatures in sequence when the overcurrent increases, the first at a relatively low and the second at a relatively high overcurrent value, a long time-delay mechanism having connections for regulating the rate of attractive movement of the first armature to delay the operation of the trip operating member to the tripping position thereby for a predetermined relatively long interval that decreases as an inverse non-linear function of the increase in overcurrent above the relatively low value, and a short time-delay mechanism having connections for regulating the rate of attractive movement of the second armature to delay the overriding operation of the trip operating member thereby to the tripping position for an interval materially less than the decreased interval provided by the long time-delay mechanism at the high overcurrent value and variable as an inverse non-linear function of the increase in the overcurrent above the relatively high value.

3. In combination a circuit breaker trip operating member provided with a pair of alternative overriding operating elements, an overcurrent responsive electromagnet having a first armature attracted thereby for moving one of the overriding operating elements to operate the trip operating member to the tripping position when the overcurrent exceeds the lower limit of a relatively low overcurrent range, a relatively-long time-delay mechanism having an adjustable spring connection with the first armature for retarding the attraction thereof, a second armature attracted by the electromagnet for moving the other overriding operating element to operate the trip operating member to the tripping position when the overcurrent exceeds the lower limit of a contiguous higher overcurrent range, a relatively short time-delay mechanism having connections with the second armature for temporarily retarding the attraction thereof to enable the second overriding element to operate the trip operating member to the tripping position before the first element upon substantially simultaneous attraction of both armatures in the higher overcurrent range, and means including the adjustable spring connection between the first overriding element and the relatively long time-delay mechanism for enabling the first overriding element to operate the trip operating member to the tripping position before the second overriding element whenever the overcurrent exceeds the upper limit of the higher range controlled by the adjustment of the spring connection, an adjustable calibrating spring connected with the relatively long time-delay mechanism for controlling the lower limit of the low overcurrent range, and an independently adjustable spring connected with the second armature for controlling the lower limit of the contiguous higher overcurrent range.

4. A double inverse time-delay circuit breaker trip mechanism having in combination a variable overcurrent responsive operating electromagnet having magnetically symmetrical parallel pairs of spaced apart opposite poles and provided with a pair of magnetically symmetrical parallel spaced apart armatures coaxially pivoted at one end adjacent one pair of poles for equi-angular movement of the other ends thereof toward the other pair of poles and having separately adjustable blasting means to cause the other ends of the parallel armatures to be sequentially attracted as the overcurrent increases, a trip operating member coaxially pivoted between the armatures and having an overriding operating connection with each armature, a short time-delay mechanism retarding the angular movement of the armature attracted at the higher current and a long time-delay mechanism retarding the equal angular movement of the other armature.

5. A double inverse time delay circuit breaker trip mechanism having in combination a pivotally mounted trip operating member, an overcurrent responsive electromagnet provided with a pair of sequentially attractable armatures coaxially pivotally mounted on opposite sides of the trip operating member and each having an overriding operating arm overlapping the trip operating member, a short time-delay mechanism controlling tripping operation of the armature attracted at the higher current and having an operating arm overhanging the axis thereof and carried thereby, and a long time-delay mechanism controlling tripping operation of the other armature and provided with a relatively movable coaxially and centrally pivoted operating lever having one end overlapping the other armature, and an adjustable spring connection between the lever and the other armature for holding the lever in overlapping engagement with the other armature during operation of the long time delay mechanism and for producing instantaneous tripping operation of the other armature in response to a predetermined maximum current.

6. A double inverse time-delay circuit breaker trip operating mechanism having in combination a variable overcurrent responsive operating electromagnet having parallel pairs of poles and a pair of coaxially pivoted parallel armatures separately equi-angularly movable from an unattracted position to the tripping position, a relatively short time-delay rotatable escapement mechanism having a rack arm overhanging the axis of one of said armatures and carried thereby and a pinion connection with the rack arm for retarding the movement of said one of said armatures to the tripping position, means for restraining the movement of the other armature to the tripping position including a relatively long time-delay dashpot device having a coaxial centrally pivoted operating lever and a relatively strong adjustable calibrating spring operatively interconnecting the operating lever with the other armature for holding the lever in overlapping engagement with the other armature during operation of the long time delay dashpot and to provide for substantially instantaneous movement of the other armature to the tripping position whenever the energizing current of the operating electromagnet exceeds a predetermined maximum value, means including an adjustable calibrating spring connected to restrain the operation of the operating lever by the other armature until the energizing current of the operating electromagnet exceeds a predetermined relatively low value, and means including an adjustable calibrating spring connected to restrain the operation of the short time-delay mechanism by the one armature until the energizing current of the operating electromagnet exceeds a predetermined intermediate value.

7. In combination an overcurrent responsive electromagnet having a spaced apart parallel aligned quadripolar magnetic structure and a pair of spaced apart parallel aligned armatures in magnetically symmetrical attractive relation therewith and provided with separately adjustable means to start attractive movement thereof in sequence as the overcurrent increases, circuit breaker trip operating means operable upon the attraction of each armature, a rotatable time-delay mechanism having operating connections with the second armature in the sequence to control the rate of attractive movement thereof, and dashpot mechanism having operative connections with the first armature in the sequence to provide a materially lower rate of attractive movement thereof upon substantially simultaneous attraction of the armatures.

8. In combination an overcurrent responsive electromagnet having a three legged magnetic structure including a pair of parallel magnetic yokes and an intermediate winding core provided with a pair of like poles in spaced-apart alignment and a pair of spaced-apart armatures coaxially pivoted respectively adjacent a corresponding one of the yokes in magnetically symmetrical attractive relation with a corresponding one of the poles and provided with separately adjustable means to start attractive movement thereof in sequence as the power current increases, a circuit breaker trip operating member coaxially pivoted between the armatures and having a separate operating connection with each armature, a rotatable short time-delay mechanism mounted adjacent one yoke of the electromagnet and having operating connections with the corresponding armature to retard the operation of the trip operating member thereby, and a long time-delay dashpot mechanism mounted beside the short time-delay mechanism adjacent the other yoke and having operating connections with the other armature to retard the operation of the trip operating member thereby.

9. In combination an overcurrent responsive electromagnet having a winding core provided with a pair of like poles in spaced-apart alignment and a pair of spaced-apart coaxial pivoted armatures in magnetically symmetrical attractive relation therewith, a separately adjustable pickup calibrating spring for each armature, a circuit breaker trip operating member coaxially pivoted between the armatures and having an overriding operating arm carried on each armature and means biasing the member toward each arm, a non-magnetic spacer member mounted on the poles and provided with stops for determining the pickup position of the armatures with the operating arms thereon in spaced relation with the trip operating member, a rotatable short time-delay mechanism mounted on one side of the electromagnet and having operating connections with the second attracted armature to retard the operation of the trip operating member thereby, and a long time-delay dashpot mechanism mounted beside the short time-delay mechanism and having an operating lever coaxially pivoted with the first attracted armature and provided with an adjustable spring connection therebetween to retard the operation of the trip operating member only while the overcurrent is in a predetermined range having an upper limit determined by the adjustment of the spring connection.

10. A double inverse time delay circuit breaker tripping mechanism having in combination an overcurrent responsive electromagnet having two spaced-apart pairs of poles provided with a channel mounting frame straddling one pair of poles and a pair of sequentially attractable spaced-apart armatures coaxially pivoted between the sides of the frame in magnetic conductive relation with the one pair of poles, a circuit breaker trip operating member coaxially pivoted between the armatures and having a separate overriding operating arm on each armature, and separate relatively short and long time-delay mechanisms mounted in juxtaposition inside the channel frame and each having an operating connection with a corresponding armature for retarding the operation of the trip operating member thereby.

11. A double inverse time delay circuit breaker tripping mechanism having in combination a stepped channel mounting frame, an overcurrent responsive electromagnet having a magnetic structure mounted on the step of the frame and including a magnetic core extending therefrom and provided with a pair of pole pieces in spaced-apart alignment at the end of the core and a pair of spaced-apart magnetic yokes extending between the sides of the channel frame in spaced-apart alignment with said pole pieces, an overcurrent responsive magnetizing winding mounted on the core, a pair of spaced-apart armatures coaxially pivoted between the sides of the channel adjacent the ends of the yokes in sequential attractive relation with the pole pieces, a circuit breaker trip operating member coaxially pivoted between the armatures and having a separate overriding operating arm on each armature, and separate relatively short and long time-delay mechanisms mounted in juxtaposition inside the channel frame adjacent said pair of yokes and each having an operating connection with a corresponding armature for retarding the operation of the trip operating member thereby.

12. A double inverse time-delay circuit breaker tripping mechanism having in combination an overcurrent responsive electromagnet provided with a channel mounting frame and a pair of sequentially attractable spaced-apart armatures coaxially pivoted between the sides of the frame, a circuit breaker trip operating member coaxially pivoted between the armatures and having a separate overriding operating arm on each armature, and separate relatively short and long time-delay mechanisms mounted in juxtaposition inside the channel frame and each having an operating connection with a corresponding armature for retarding the operation of the trip operating member thereby, an open boxlike enclosing casing for telescoping the mechanism channel mounting frame therein and provided with fastening means for securing the channel frame to one wall thereof, and a separate pick-up calibrating spring for each armature having an adjustable member movably mounted on the opposite wall of the casing for adjustment from the exterior thereof.

13. A double inverse time-delay circuit breaker tripping mechanism having in combination an overcurrent responsive electromagnet provided with a channel mounting frame and a pair of sequentially attractable spaced-apart armatures coaxially pivoted between the sides of the frame, a circuit breaker trip operating member coaxially pivoted between the armatures and having a separate overriding operating arm on each armature, and separate relatively short and long time-delay mechanisms mounted in juxtaposition inside the channel frame and each having an operating connection with a corresponding armature for retarding the operation of the trip operating member thereby, an open boxlike enclosing casing for telescoping the channel mounting frame therein and provided with fastening means for securing the channel frame to one wall thereof, and separate pickup calibrating springs for each armature having an adjustable member movably mounted on the opposite wall of the casing for adjustment from the exterior thereof, and a removable cover for the enclosing casing mounted on the electromagnet and having a slot for extending the circuit breaker trip operating member therethrough and provided with stops for limiting the movement of each armature away from the electromagnet.

JOHN A. OPPEL.

REFERENCES CITED

The following references are of record in the file of this patent:

UNITED STATES PATENTS

| Number | Name | Date |
|---|---|---|
| 1,914,582 | Scott | June 20, 1933 |
| 2,439,165 | Graves | Apr. 6, 1948 |
| 2,479,385 | Madden | Aug. 16, 1949 |
| 2,486,613 | Ridgley | Nov. 1, 1949 |
| 2,488,745 | Stratton | Nov. 22, 1949 |
| 2,495,127 | Oppel | Jan. 17, 1950 |
| 2,503,154 | Graves | Apr. 4, 1950 |